US006284012B1

(12) United States Patent
Mundschenk et al.

(10) Patent No.: US 6,284,012 B1
(45) Date of Patent: Sep. 4, 2001

(54) KELP/SEAWEED EXTRACT BIOCATALYST AND METHODS OF MAKING SAME

(76) Inventors: David D. Mundschenk, 504 SE. 2nd Ave.; Paul Reid, 36 SE. 2nd Ave., both of Dania, FL (US) 33004

( * ) Notice: Subject to any disclaimer, the term of this patent is extended or adjusted under 35 U.S.C. 154(b) by 0 days.

(21) Appl. No.: 09/193,496

(22) Filed: Nov. 16, 1998

(51) Int. Cl.$^7$ ............................. C05F 11/00; A01N 25/00
(52) U.S. Cl. ..................... 71/23; 514/783; 504/116
(58) Field of Search .................. 424/195.1; 514/783; 504/116; 71/11, 23; 502/150

(56) References Cited

U.S. PATENT DOCUMENTS

| | | |
|---|---|---|
| 3,527,591 | 9/1970 | Stauter . |
| 3,764,707 | * 10/1973 | Habersberger ...................... 424/361 |
| 4,056,612 | * 11/1977 | Lin ........................................ 424/76 |
| 4,096,871 | 6/1978 | Vlahakis . |
| 4,125,392 | 11/1978 | Primo . |
| 4,409,144 | 10/1983 | Heinicke . |
| 4,543,212 | 9/1985 | Heinicke . |
| 4,666,606 | 5/1987 | Heinicke . |
| 4,810,385 | 3/1989 | Hater et al. . |
| 4,911,832 | 3/1990 | Miller et al. . |
| 4,925,564 | 5/1990 | Francis . |
| 4,994,264 | * 2/1991 | Verdon et al. ........................ 424/63 |
| 5,201,930 | 4/1993 | Campbell . |
| 5,225,083 | 7/1993 | Pappas et al. . |
| 5,271,829 | 12/1993 | Heppenstall . |
| 5,288,491 | 2/1994 | Moniz . |
| 5,433,846 | 7/1995 | Roshanravan . |
| 5,501,973 | 3/1996 | Mayfield . |
| 5,507,954 | 4/1996 | Carrillo . |
| 5,516,687 | 5/1996 | Perez et al. . |
| 5,543,050 | 8/1996 | Roshanravan . |
| 5,543,058 | 8/1996 | Miller . |
| 5,567,314 | 10/1996 | Chigusa et al. . |
| 5,645,623 | 7/1997 | Voroney . |
| 5,683,575 | 11/1997 | Yates et al. . |

FOREIGN PATENT DOCUMENTS 664989   1/1952  (GB) .

OTHER PUBLICATIONS

Xunzhong Zhang and R.E. Schmidt, *Growth Regulators Impact on a–Tocopherol Status in Water–stressed Poa Pratensis L.*, (1995).

J. Yan, R.E. Schmidt and D.M. Ocrcutt, *Influence of Fortified Seaweed Extract and Drought Stress on Cell Membrane Lipids and Sterols of Ryegrass Leaves*, (1993).

H. Sun, R.E. Schmidt, and J.D. Eisenbak, *The Effect of Seaweed Concentration on the Growth of Nematode–Infected Bentgrass Grown Under Low Soil Moisture*, (1993).

I. J. Crouch, *The Effect of Seaweed Concentrate on Plant Growth*, (Dec. 1990).

*Kel–Plex Liquid Seaweed Extract Biostimulant and Micronutrient Spray*, (1990).

*PX–700 C "Grease, Oil& Odor Control" A Source of the Stimulant for Biological Burning of Grease*, (1985).

Advertisement for PX–700 Organic Concentrate, (1980).

Advertisement for Sure Flow Concentrate, (1985).

Advertisement for Shur–Crop The Organic Program for Golf Course Maintenance, (1985).

Advertisement for KLP–311, (1982).

Advertisement for LDX–100–G A Source of the Stimulant For Biological Burning of Grease, (1982).

Aresco, *KX–7 A New Material For the Treatment of Grease Traps, Sewer Lines, Cesspools and Sewage Treatment Plants*, (Oct. 29, 1982).

Advertisement for Bactozap (PX–700C), (1980).

Advertisement for Bio–Stim G. Concentrate, (1980).

Advertisement for Shur–Kleen, (1982).

Dr. Ralph Heinicke, *Application of Shur–Go for Trouble–Free Operation of Grease Traps and Improving Sewage Treatment Plant Efficiency*, (1979).

* cited by examiner

*Primary Examiner*—Steven P. Griffin
*Assistant Examiner*—Eileen E. Nave
(74) *Attorney, Agent, or Firm*—Robert J. VanDerWall

(57) ABSTRACT

Kelp/seaweed extract biocatalyst compositions, methods of making the kelp/seaweed extract biocatalyst compositions and methods of using these biocatalyst compositions are disclosed. The biocatalyst compositions are useful in wastewater treatment, bioremediation and the elimination of grease from grease traps and sewage systems. In addition, the biocatalyst compositions are useful in home, garden and lawn care applications.

24 Claims, No Drawings

KELP/SEAWEED EXTRACT BIOCATALYST AND METHODS OF MAKING SAME

FIELD OF THE INVENTION

This invention relates, generally, to kelp/seaweed extract biocatalyst compositions, methods of making the kelp/seaweed extract biocatalyst compositions and methods of using these biocatalyst compositions. The biocatalyst compositions of the present invention are useful in wastewater treatment, bioremediation and the elimination of grease from grease traps and sewage systems. In addition, the biocatalyst compositions are useful in home, garden and lawn care applications.

BACKGROUND OF THE INVENTION

This invention relates to kelp/seaweed extract biocatalyst compositions, which are useful in clearing domestic, commercial and industrial grease traps of grease consisting of animal fats, primary triglycerides with some proteins, and vegetable oils. The biocatalyst compositions of the present invention are also useful in wastewater treatment facilities, bioremediation processes, and home, garden and lawn care applications.

As is well known in the art, complex proteins, celluloses, starches, fats, grease and other contaminants can cause drain clogging. Clogged drains are particularly acute in the food preparation business. Large quantities of oil, fat, starch, and grease are used in the preparation of food, or are a by-product of food preparation. Therefore, restaurants and other food preparation establishments provide, in their food preparation areas, what is referred to as a grease trap at the input point to the sewer or septic system. The grease trap is used to collect the oil, fat, starch, grease and other contaminants and to prevent contaminants from entering and impairing the operation of the sewer or septic system. The contaminants that find their way into the grease trap of a food preparation establishment are problematic in that they tend to solidify and clog the grease trap itself which may allow some contaminants access to the sewer or septic system.

Commercial and industrial grease traps are typically cleaned by removing the contents using a vacuum trick, or other mechanical means, for disposal of the contaminants elsewhere. Grease that has become impacted in drain lines and in the grease trap itself, is largely unaffected by this pumping operation, and negatively affects the effective operation of the grease trap. For example, the accumulation of solid material, including particles of food, frequently either totally or partially blocks the flow of effluent through the grease trap.

The cleaning of a grease trap is a dirty, smelly and generally unpleasant task. Consequently, there is an understandable reluctance on the part of food service personnel to clean the trap. If a trap is located in a high volume operation, it fills with grease very quickly and generally is effective only for a short period of time between cleanings. If the trap is not cleaned on a regular basis it becomes saturated with grease and other contaminants and looses its grease separating capability. When this happens, grease laden wastewater flows through the trap and into the downstream pumping which either causes clogging or discharging into the municipal sewage system. A clogged trap can also cause backup damage, interruption in service, and expensive emergency plumbing and drain cleaning charges.

The over taxing of municipal sewage treatment facilities, is becoming, a serious problem in many communities. Therefore, stringent regulations are being put in place which require a reduction in the volume of grease and insoluble solids, which may be discharged into municipal facilities. In addition, grease trapped waste is classified as a hazardous material in many areas. Accordingly, increased attention has been given to finding improved processes both for separating grease and solid materials from waste material and for recycling the separated solid materials for other uses.

The ideal solution to the problem of accumulated grease in a grease trap is the creation of a proper environment and ecosystem within the grease trap and connecting drain system which is conducive to the growth of bacterial microorganisms that are designed to biodigest the grease, thereby eliminating the problem, not only in the grease trap, but also in the drain system to which the grease trap is connected. Proper bacterial growth and bacterial biodigestion of the grease depends upon the creation of a chemically neutral, naturally stimulated, non-toxic environment in the grease trap.

Numerous prior art approaches have attempted to efficiently and cost effectively dispose of the grease, oils and fats found in grease traps. For example, U.S. Pat. No. 4,666,606 to Heinicke (the '606 patent) discloses that xeronine is useful in eliminating grease, sewage odor and hydrogen sulfide from restaurant grease traps and municipal sewage systems. The xeronine works by stimulating the metabolism of the resident anaerobic and aerobic bacteria. However, xeronine has a relatively short shelf life. Proxeronine, which is a precursor to xeronine is stable in solution at room temperature for extended periods of time. The '606 patent discloses that mixing proxeronine and proxeroninase at the site of use produces more reliable results than attempting to use the more labile xeronine. A five percent (5%) kelp extract is used as a source of proxeronine that is degraded by proxeroninase in the grease trap to form xeronine. The '606 patent discloses that the five percent (5%) kelp extract which is used as a source of proxeronine contains 125 ppm (w/w) proxeronine. The '606 patent discloses that proxeroninase is generally present in restaurant grease traps in sufficient quantities due to the disposal of milk into the grease trap. However, if a sufficient quantity of milk is not present proxeroninase must be added in the form of a whey-salt solution. The '606 patent posits that a small size grease trap with a daily throughput of five hundred gallons (500 gal.) of sink waste requires approximately one pint of kelp extract per day. This amounts to about 50 mgs of proxeronine per day or about 1.4 $\mu$g/gal. of kitchen waste provided a source of proxeroninase is also present. The invention disclosed in the '606 patent has several shortcomings. As a practical matter the instability of xeronine presents handling problems in that a source of proxeronine and proxeroninase must be present. Due to the instability of xeronine the sources of proxeronine and proxeroninase must be mixed immediately prior to use. The '606 patent does not teach how to prepare the 5% kelp extract that contains proxeronine. In addition, the scientific community has been unable to reproduce any of the results regarding the production and isolation of xeronine, proxeronine and proxeroninase.

U.S. Pat. No. 4,925,564 to Francis (the '564 patent) discloses methods for maintaining the level of bacterial growth within a grease trap. The method includes positioning, within the grease trap, a bacterial incubator that is adapted to float at the air to liquid interface. Bacterial cultures are then added to the incubator in the grease trap to facilitate the reduction of grease and other organic materials in the grease trap. A shortcoming of the invention of the '564 patent is that the solution containing the bacterial cultures must be prepared in advance and is added to the aqueous medium. Therefore, the great majority of the bacteria may flow through and past the collecting container. In addition, this loss of bacteria requires the use of large quantities of bacteria in order to maintain an effective bacterial level within the collecting container. Maintaining large quantities of bacteria is both time consuming and expensive.

U.S. Pat. No. 4,810,385 to Hater et al. (the '385 patent) discloses a porous fabric sock-like member filled with dried bacterial cultures. The sock is placed directly in the path of the waste stream flow. As the waste stream flows through the sock-like member the dried bacterial cultures or microorganisms are wetted and released into the waste stream. The invention of the '385 patent also results in loss of bacterial cultures from the collecting container. Further, the method of the '385 patent requires continual monitoring of the bacterial content of the sock-like member. In addition, replacing the spent sock-like members can be objectionable because the sock-like member is usually saturated with sewage.

U.S. Pat. No. 5,683,575 to Yates et al. (the '575 patent) discloses the use of various digesting agents which have been developed to digest grease and sludge, i.e., protein, starch and/or fat deposits, in an aqueous solution or suspension. The digesting agents are suitable for washing away with the wastewater. Such digesting agents may include aerobic and/or anaerobic bacteria and, optionally, enzymes. Suitable enzymes, when present include proteases, amylases, lipases and/or cellulases. The particular bacteria and/or enzymes of the digesting agent are chosen with regard to the nature of the organic material to be biodegraded.

The '575 patent further discloses that efficiency is optimized by introducing the digesting agent into the horizontal pipe of the drainage system during a period when the water flow rate therethrough is at its lowest and the temperature of the wastewater is less than 60° C., for example, at night. The '575 patent has various shortcomings in that the digesting agent typically needs to remain in the grease trap for a period of 4–5 hours, in order to act on the grease layer trapped in the central chamber of the grease trap. In addition, this preventative procedure relies on an operator remembering to manually introduce the digesting agent at an appropriate time following which the drainage system is expected to be quiescent and the wastewater in the drainage system is expected to be at a temperature of less than 60° C. Furthermore, following the introduction of the digesting agent, a period of time typically from 20 to 120 minutes elapses before the digesting agent becomes fully active.

U.S. Pat. No. 5,225,083 to Pappas et al. (the '083 patent) discloses a method for the bioremediation of the contents of a grease trap. The method includes the steps of mechanically removing solid materials such as plastic items, food particles and the like from entrances to all drain lines and the drain lines themselves terminating in the grease trap. The method prevents the flow into the drain lines and grease trap of all chemicals that are detrimental to the growth of endemic bacteria. The pH of the water effluent in the grease trap is adjusted by introducing a basic material, such as, baking soda into the grease trap and mixing or stirring the water. This adjustment in pH stimulates the endemic bacteria resident in the grease trap. Bacteria may be added to one or more of the drain lines for ultimate introduction into the grease trap for biodigesting any grease in the drain lines and grease trap. Oftentimes it is difficult to maintain an optimal pH in the grease trap that is sufficient to stimulate the resident endemic bacteria. Further, if it becomes necessary or desirable to introduce bacteria to the grease trap the method of the '083 patent becomes increasingly more time consuming and expensive.

U.S. Pat. No. 5,271,829 to Heppenstall (the '829 patent) discloses a dispenser for introducing treatment material into a grease trap for the purpose of digesting the grease or other hazardous materials which is separated from the wastewater that flows through the grease trap. The dispenser includes a housing having a compartment for holding a quantity of grease digesting material and a dispensing opening at the lower end of the compartment. A restrictor is located at the dispensing opening for enabling the digesting material to pass from the dispensing opening to the grease and other materials to be treated in the chamber of the grease trap at a constant restrictive rate. The method of the '829 patent requires time consuming and expensive monitoring of the dispenser's contents and rate of dispensing for optimal beneficial results.

Finally, the present inventors are aware of a proprietary kelp extract composition, called PX700, that is useful as a biocatalyst for treating grease traps and for stimulating plant growth. In particular, the kelp extract is prepared using methanol and the resultant biocatalyst methanol solution contains citric acid as a preservative. This proprietary kelp extract biocatalyst has several shortcomings. For example, the accidental ingestion of the biocatalyst methanol solution can have deleterious effects on humans or other animals. In addition, the citric acid is ineffective as a preservative. As a result, containers of this biocatalyst have an extremely short shelf life and have been known to expand and in some instances explode due to the overgrowth of bacterial and fungal contaminants. Further, upon storage of the biocatalyst, components of the biocatalyst methanol solution precipitate out of solution, which requires resolubilization of these components. The resolubilization of these precipitated components is achieved with variable results leading to unacceptably disparate efficacies between containers of biocatalyst.

It is also well known in the art that kelp extracts have been used in the agricultural arts, including home, garden and lawn care applications. However, it is believed that all of these kelp extracts are prepared with extraction methods utilizing methanol. As is known, the accidental ingestion of methanol can have deleterious effects on humans or other animals. Further, to the extent that preservatives are used in these known kelp extracts, it is believed that these kelp extracts use conventional preservatives. As is known in the art, conventional preservatives, such as benzalkonium chloride, require dilutions of 1:100 or 1:10,000 or more in order to become ineffective bactericidal agents during use. Preservatives such as thimerosal and phenol continue to be bactericidal at dilutions of 1:50,000 and even 1:100,000. Since the growth of endemic bacteria is a desired effect in many applications that use kelp extracts, the dilutions necessary to render the conventional preservatives ineffective during use adversely effect the efficacy of the kelp extract to enhance not only the growth of endemic bacteria but also the growth of the crops or plants being treated.

In view of the prior art at the time the present invention was made, it was not obvious to those of ordinary skill in the pertinent art how the needed biccatalyst compositions and methods for waste water treatment, bioremediation and the elimination of grease from grease traps and sewage systems could be provided. Further, in view of the prior art at the time the present invention was made, it was not obvious to those of ordinary skill in the pertinent art how the needed biocatalyst compositions and methods useful in home, garden and lawn care applications could be provided.

SUMMARY OF THE INVENTION

In view of the foregoing problems and limitations of the prior art, there is a need for a sterile non-toxic kelp extract biocatalyst composition. There is also a need for sterile non-toxic kelp extract biocatalyst compositions that contain a preservative, which is diluted to an ineffective level during use. In addition, there is a need for such sterile non-toxic kelp extract biocatalyst compositions and methods for waste water treatment, bioremediation and the elimination of grease from grease traps and sewage systems. Further, there is a need for such sterile non-toxic kelp extract biocatalyst compositions and methods useful in home, garden and lawn care applications.

The invention achieves these and other objects and advantages by providing a method for preparing a biocatalyst. The method for preparing the biocatalyst includes the steps of providing a source of kelp; adding a five percent ethyl alcohol aqueous solution to the source of kelp, the five percent ethyl alcohol aqueous solution containing an effective amount of a preservative, to provide a kelp/five percent ethyl alcohol aqueous solution containing the effective amount of the preservative; reacting the kelp/five percent ethyl alcohol aqueous solution containing the effective amount of the preservative under conditions and for an amount of time sufficient to extract the kelp/five percent ethyl alcohol aqueous solution containing the effective amount of the preservative; and filtering the kelp/five percent ethyl alcohol aqueous solution containing the effective amount of the preservative to provide a kelp extract/five percent ethyl alcohol biocatalyst solution containing the effective amount of the preservative.

A kelp extract/five percent ethyl alcohol biocatalyst containing an effective amount of a preservative such that the preservative is diluted to an ineffective amount during use of the biocatalyst is also disclosed.

A method of eliminating grease and odors using the kelp extract/five percent ethyl alcohol biocatalyst containing the effective amount of the preservative is also provided. Grease and odors are eliminated by contacting an admixture of grease, oil and organic particulate matter, under conditions and for an amount of time sufficient to eliminate the grease and odors, with an effective amount of a kelp extract/five percent ethyl alcohol biocatalyst solution. The kelp extract/five percent ethyl alcohol biocatalyst solution contains an effective amount of a preservative such that the preservative is diluted to an ineffective amount during contacting with the admixture of grease, oil and organic particulate matter.

A method of promoting plant growth, increasing root mass, enhancing blooming, new growth and resistance to drought is also provided. The leaves of a plant or the soil area around the base of the plant are contacted with a sufficient amount of the kelp extract/five percent ethyl alcohol biocatalyst solution which contains an effective amount of a preservative followed by the addition of an effective amount of water that is sufficient to dilute the preservative to an ineffective amount.

In addition, a method of bioremediation is provided. Bioremediation is effected by contacting the contents of a grease trap under conditions and for an amount of time sufficient to convert hazardous wastes and pollutants into harmless materials, with an effective amount of a kelp extract/five percent ethyl alcohol biocatalyst solution. The kelp extract/five percent ethyl alcohol biocatalyst solution contains an effective amount of a preservative that is diluted to an ineffective amount during contacting with the contents of the grease trap.

Further, a method of treating wastewater is provided. The wastewater is contacted, under conditions and for an amount of time sufficient to convert hazardous wastes and pollutants into harmless materials, with an effective amount of a kelp extract/five percent ethyl alcohol biocatalyst solution which contains an effective amount of a preservative such that the preservative is diluted to an ineffective amount during contacting with the wastewater.

For a better understanding of the present invention reference is made to the following detailed written description and the scope of the invention will be indicated in the claims.

DETAILED DESCRIPTION OF THE INVENTION

In accordance with the present invention, a method of preparing a biocatalyst is disclosed. The method includes providing a source of kelp. Kelp or seaweed may be obtained from numerous aquatic plant sources including *Laminaria digitata, Laminaria saccharina, Laminaria cloustoni Edmondst, Fucus versiculosus, Ecklonia maxima, Durvillea antarctica, Pachymenia himantophora, Macrocystis integrifolia, Hypnea chordacea f. simpliciuscula, Hypnea charoides, Hypnea japonica, Hypnea cervicornia, Hypnea musciformis, Hypnea bryoids, Hypnea pannosa, Hypnea erecta, Hypnea specifera, Hypnea saidana*, and *Ascophyllum nodosum. Ascophyllum nodosum* seaweed, commonly known as Norwegian Kelp, Common wrack or Rockweed, a brown seaweed, which grows along the North Atlantic shorelines of Canada and Europe is particularly preferred. The kelp may be freshly harvested kelp and is available in bundles of kelp leaves. Alternatively, the kelp may be processed and pelletized into a kelp meal or pulverized into a kelp flour. For purposes of the present invention the source of kelp is a kelp meal or a kelp flour. Kelp meal and kelp flour are available from several sources including, Acadian Seaplants Limited, 30 Brown Avenue, Dartmouth, Nova Scotia, Canada B3B 1X8;Kelp Products International, 150 Connie Crescent, Unit #4, Concord, Ontario L4K1L9; and McCullough's Feed and Seed, Hilliard Street, Lanark, Ontario K0G 1K0.

The kelp meal or kelp flour is extracted with a five (5%) ethyl alcohol aqueous solution. For purposes of the present invention the ethyl alcohol is non-denatured. Suitable non-denatured ethyl alcohols include food grade ethyl alcohol, anhydrous ethyl alcohol, reagent grade ethyl alcohol and high performance liquid chromatography grade ethyl alcohol. These non-denatured ethyl alcohols are readily available from any chemical company including Sigma Chemical Company, St. Louis, Mo. Preferably non-denatured food grade ethyl alcohol is used in the extraction process. The kelp meal or kelp flour may be extracted with non-denatured ethyl alcohol at a concentration in deionized water ranging from one percent (1%) to ten percent (10%). Preferably, the non-denatured ethyl alcohol is present at a concentration of five percent (5%) in deionized water.

A preservative is added to the five percent (5%) ethyl alcohol aqueous solution to prevent the growth of contaminating bacteria and fungi. Preservatives useful in the present invention are those in a class of preservatives called parabens. Parabens effectively inhibit the growth of bacteria and fungi when present in solution in concentrations of from 0.1% to 2.0%. Parabens become ineffective inhibitors of bacterial and fungal growth when diluted. Accordingly, parabens are particularly useful when a sterile or non-contaminated starting solution is required, such as the biocatalyst of the present invention, but are readily diluted to an ineffective level during use and therefore do not inhibit indigenous bacteria and fungi at the site of application. Depending upon the starting concentration parebens become ineffective when diluted 1:10 or 1:4 and in some applications when diluted 1:2.

Parabens useful in the present invention include methylparaben, propylparaben, ethylparaben, butylparaben, benzylparaben and heptylparaben. The preservative is preferably present in an amount of from 0.1 percent to 2.0 percent of the five percent ethyl alcohol aqueous solution. In a preferred embodiment, the preservative is present in an amount of from 0.1 percent to 0.5 percent of the five percent ethyl alcohol aqueous solution. In a more preferred embodiment, the preservative is present in an amount of from 0.3 percent to 0.4 percent of the five percent ethyl alcohol aqueous solution, while in a most preferred embodiment the preservative is present in an amount of 0.2 percent of the five percent ethyl alcohol aqueous solution. Methylparaben or propylparaben or a combination of the two is the preferred preservative for use in the present invention, while the use of methylparaben is most preferred. As will be appreciated by those skilled in the art the preservative may also be added immediately after the filtering step discussed below. However, for optimum results the preservative should be added at the beginning of the extraction process to inhibit any bacterial and fungal growth during the extraction reaction which can have an incubation period of up to 48 hours.

Any suitable reaction vessel may be used to react the kelp meal or kelp flour with the five percent (5%) non-denatured food grade ethyl alcohol to provide the kelp extract/five percent ethyl alcohol biocatalyst. In particular, the kelp meal or kelp flour may be added to the reaction vessel followed by the addition of a five percent (5%) ethyl alcohol aqueous solution. The contents of the reaction vessel may be gently agitated by any mechanical means known in the art. Alternatively, after initial mixing or stirring of the contents of the reaction vessel further agitation is not necessary. Preferably, from five (5) grams to fifty (50) grams of kelp meal or kelp flour are reacted with every liter of five percent (5%) ethyl alcohol aqueous solution. In a more preferred embodiment, ten (10) grams to thirty (30) grams of kelp meal or kelp flour are reacted with every liter of five percent (5%) ethyl alcohol aqueous solution. Optimum results are obtained by reacting twenty (20) grams of kelp meal or kelp flour with a liter of five percent (5%) ethyl alcohol aqueous solution.

The kelp meal or kelp flour is reacted with the five percent (5%) ethyl alcohol aqueous solution for a sufficient amount of time and under suitable conditions to extract nutrients including but not limited to, proteins, growth factors and other beneficial components, such as vitamins and minerals from the kelp meal or kelp flour. Specifically, reaction times of from two (2) minutes to forty-eight (48) hours are suitable for extractions using the kelp meal. Preferably, reaction times of from one-half (0.5) hour to twenty-four (24) hours are suitable, while in a most preferred embodiment reaction times of from four (4) to six (6) hours are suitable. Reaction times may be less when extracting the kelp flour. For example, reaction times of from one (1) minute to twenty-four (24) hours are suitable for extractions using the kelp flour. Preferably, reaction times of from two (2) minutes to six (6) hours are suitable, while in a most preferred embodiment reaction times of from one-half (0.5) hour to two (2) hours are suitable. The reaction may be performed at room temperature. If necessary the reaction vessel may be heated to facilitate the extraction of nutrients from the kelp meal or kelp flour. As is known by those skilled in the art the reaction vessel should not be heated to temperatures that are sufficient to denature the nutrients, proteins and other molecules extracted from the kelp meal or kelp flour and such temperatures are readily ascertainable by those skilled in the art.

After the extraction reaction is complete, generally after four to six hours of incubation, the kelp meal, five percent ethyl alcohol mixture which contains a preservative is filtered to remove the kelp meal and to provide a kelp extract/five percent ethyl alcohol biocatalyst solution containing an effective amount of a preservative. Preferably, the kelp meal, five percent ethyl alcohol mixture is filtered through a 100 $\mu$m filter. If a particular application requires sterility beyond 100 $\mu$m, the 100 $\mu$m filtrate may be refiltered until the desired sterility is attained.

In the case of kelp flour, after the extraction reaction is complete, generally after one-half (0.5) hour to two (2) hours of incubation, the kelp flour, five percent ethyl alcohol mixture which contains a preservative is centrifuged and filtered to remove the kelp flour and to provide a kelp extract/five percent ethyl alcohol biocatalyst solution containing an effective amount of a preservative. As is known in the art, the kelp flour, five percent ethyl alcohol mixture may be centrifuged by any means and under conditions sufficient to remove the kelp flour. Preferably, the kelp flour, five percent ethyl alcohol mixture is centrifuged at 1200 rpms for fifteen minutes and the supernatant is filtered through a 100 $\mu$m filter. As indicated above, if a particular application requires sterility beyond 100 $\mu$m, the 100 $\mu$m filtrate may be refiltered until the desired sterility is attained.

The kelp extract/five percent ethyl alcohol biocatalyst of the present invention has several advantages over prior art kelp extract preparations. Prior art kelp extracts, which are known to the present inventors, are prepared with methanol, which can have deleterious effects if ingested by humans or other animals. The kelp extract/five percent ethyl alcohol biocatalyst of the present invention is not toxic and can be used in applications in which humans or other animals may consume the biocatalyst. In addition, if a child accidentally consumes the biocatalyst of the present invention, the child will not suffer the ill effects that are associated with methanol consumption. Further, the kelp extract biocatalyst of the present invention is stable at room temperature for long periods of time without the settling out of active ingredients or the expansion or explosion of containing vessels due to the generation of gases from contaminating bacteria and fungi as found in prior art kelp extract preparations.

The kelp extract/five percent ethyl alcohol biocatalyst of the present invention is useful in numerous applications. In particular, the biocatalyst of the present invention is useful in applications in which the stimulation of indigenous bacteria and fungi are desired without the introduction of foreign bacteria and fungi. The biocatalyst of the present invention is sterile due to the presence of methylparaben, which upon contact at the time of application is diluted to such an extent that it is no longer inhibitory to bacteria and fungi.

The biocatalyst of the present invention is useful for eliminating grease and odors in, for example, a grease trap. An effective amount of the preservative containing kelp extract/five percent ethyl alcohol biocatalyst is contacted with an admixture of grease, oil and organic particulate matter under conditions and for an amount of time sufficient to eliminate the grease and odors. The amount of biocatalyst required to eliminate grease and odors will depend on the volume of the admixture of grease, oil and organic particulate matter. Generally, from 25 mls to 150 mls of the kelp extract/five percent ethyl alcohol preservative containing biocatalyst solution will be added to the grease, oil and organic particulate matter admixture in a conventional grease trap. Preferably, from 50 mls to 100 mls of the kelp extract/five percent ethyl alcohol preservative containing biocatalyst solution will be added to a conventional grease trap. As is known by those skilled in the art periodic monitoring of the grease content and odors emanating from the admixture is necessary. In addition, periodic additions of the biocatalyst may be necessary to maintain an equilibrium if additional grease, oil and organic particulate matter are added to the admixture. As a practical matter it may be necessary to circulate the admixture or a portion of the admixture to facilitate dispersion of the biocatalyst. It may also be necessary to limit the amount of grease, oil and organic particulate matter added to the admixture until an equilibrium is achieved, as evidenced by the breaking up of the grease and oil and less odors emanating from the admixture. Typically, upon initial treatment with the biocatalyst of the present invention, a conventional grease trap will be treated daily for two to three days with from 50 mls to 150 mls of the biocatalyst. After the second or third day, weekly treatments thereafter will be sufficient to maintain the equilibrium established and continue to break up the grease and oil and to control the odors emanating from the grease trap.

The biocatalyst of the present invention is also useful for promoting plant growth, increasing root mass, enhancing blooming, new growth and resistance to drought. The leaves of a plant or the soil area around the base of a plant is treated with a sufficient amount of the kelp extract/five percent ethyl alcohol biocatalyst solution which contains an effective amount of a preservative followed by the addition of an effective amount of water sufficient to dilute the preservative to an ineffective amount. In particular, if the biocatalyst is applied to the leaves of the plant the biocatalyst solution may be added to a spray bottle and diluted 1:2 with water. The diluted biocatalyst may then be sprayed onto the plant as a light mist. For some plants it may be desirable to also provide trace elements and complex salts, from natural seawater. If this is desired seawater preserved with 0.2% methylparaben may be added to the kelp extract biocatalyst. In particular, one part preserved seawater may be added to four to ten parts kelp extract biocatalyst followed by a further 1:1 dilution with water prior to application, as a mist, to the leaves of a plant.

Alternatively, the kelp extract biocatalyst may be applied to the soil area around the base of the plant. Specifically, the kelp extract biocatalyst may be applied as a concentrate to the soil area around the base of the plant, followed by watering with an amount of water sufficient to dilute the preservative to an ineffective amount. Similarly, the biocatalyst solution may be added to a bottle and diluted 1:2 with water. The diluted biocatalyst may then be applied to the soil area around the base of the plant. In addition, it may be desirable to also provide trace elements and complex salts from natural seawater. If this is desired, seawater preserved with 0.2% methylparaben may be added to the kelp extract biocatalyst as indicated above and applied to the soil area around the base of the plant.

The biocatalyst of the present invention is useful for bioremediation of grease and organic matter in, for example, a grease trap or a wastewater treatment facility tank. An effective amount of the preservative containing kelp extract/ five percent ethyl alcohol biocatalyst is contacted with an admixture of grease, oil and organic particulate matter under conditions and for an amount of time sufficient to convert hazardous wastes and pollutants into harmless materials. The amount of biocatalyst required to convert the hazardous wastes and pollutants into harmless materials will depend on the volume of the admixture undergoing bioremediation. Generally, from 25 mls to 2500 mls of the kelp extract/five percent ethyl alcohol preservative containing biocatalyst solution will be added to the grease trap or wastewater treatment tank. As is known by those skilled in the art periodic monitoring of the contents of the grease trap or wastewater treatment tank is necessary. In addition, periodic additions of the biocatalyst may be necessary to maintain an equilibrium.

EXAMPLES

The following Examples serve to provide further appreciation of the invention, but are not, in any way, to be considered restrictive of the effective scope of the invention.

Example 1

The biocatalyst of the present invention was prepared by reacting 40 grams of kelp meal obtained from Acadian Seaplants Limited, 30 Brown Avenue, Dartmouth, Nova Scotia, Canada B3B 1X8 with 2 liters of non-denatured food grade ethyl alcohol obtained from Sigma Chemical Company, St. Louis, Mo. The kelp meal was added to a three (3) liter beaker followed by the addition of 2 liters of non-denatured food grade ethyl alcohol containing 0.2% methylparaben. The reaction mixture was stirred, covered and allowed to react at room temperature for 5 hours. Subsequently, the reaction mixture was filtered through a 100 µm filter and dispensed into sterile 1 liter containers. Two (2) liters of the biocatalyst were recovered after filtering.

Example 2

The biocatalyst of the present invention was prepared by reacting, 40 grams of kelp flour obtained from Acadian Seaplants Limited, 30Brown Avenue, Dartmouth, Nova Scotia, Canada B3B 1X8 with 2 liters of non-denatured food grade ethyl alcohol obtained from Sigma Chemical Company, St. Louis, Mo. The kelp flour was added to a three (3) liter beaker followed by the addition of 2 liters of non-denatured food grade ethyl alcohol containing 0.2% methylparaben. The reaction mixture was stirred, covered and allowed to react at room temperature for one-half (0.5) hour. Subsequently, the reaction mixture was centrifuged for fifteen minutes at 1200 rpms and the supernatant was filtered through a 100 µm filter and dispensed into sterile 1 liter containers. Two (2) liters of the biocatalyst were recovered after filtering.

Example 3

The ability to the biocatalyst of the present invention to eliminate grease and odors, convert hazardous wastes and pollutants into harmless materials was demonstrated using a bench top grease trap/septic tank that emulated the environmental conditions found in grease traps and septic systems. In particular, a two liter scaled down version of a grease trap/septic tank was designed. Specifically, the ratio of tank diameter to depth was approximately 1:2.5 to 1:3 in order to mimic the conditions found in a full scale grease trap/septic tank, and to promote the development of aerobic and anerobic margins found in such environments. An inlet and outlet incorporated T-junctions to facilitate and control the flow of incoming waste. A tube connected both the inlet and the outlet, which was lower than the inlet, to which a peristaltic pump was attached. A flow rate of 2 mls/min. was initiated in the direction of the inlet from the outlet. The containers also had a capped opening that mimicked a manhole cover, which is normally found in grease traps and septic tanks. The cap allowed for ventilation above the contents while maintaining an anerobic environment deeper in the system. This closed system allowed an assessment and examination of the effects of the biocatalyst directly on the contents of the grease trap/septic tank without variables such as flushing, heat variations, and residence time.

The bacterial make-up of grease trap and septic tank environments is extremely diverse. Accordingly, cultures were obtained from household kitchen and bathroom drain traps. Gut microflora, in the form of mouse feces were also obtained. Nutrients including yeast extracts, protein digests and milk powder were provided. The cultures and nutrients were mixed with tap water and divided into three tank containers described above. A mixture of vegetable and animal fats, including pork fat and butter, was heated, mixed and added to each tank container to create a 1 cm thick grease cap as is found in restaurant grease traps. The tanks were incubated at room temperature for three days to allow settling and bacterial and fungal growth.

Tank 1 was reserved as a control, consequently nothing further was added to Tank 1.

Three (3) mls of the biocatalyst prepared in Example 1 was added to Tank 2. The biocatalyst was added through the capped top. In order to facilitate the dissemination of the biocatalyst throughout the tank a small hole, approximately 2.5 cm to 3 cm was made through the grease cap through which the biocatalyst was added. Piercing the grease cap is the standard practice in restaurants during the initial treatment of a grease trap.

Two (2) mls of BIOSOLVE® brand water based biodegradable surfactant, which is known to be effective in clearing grease traps, was added to Tank 3 in the same manner.

The pumps to each tank were switched on at 2 ml/min. and the tanks were observed for two (2) weeks.

During this 2 week period gas bubbles appeared under the grease cap in all tanks indicating that anaerobic digestion was taking place. Odor was present in all tanks. However, the odor from Tank 2, using the catalyst of the present invention was markedly less pungent that the odors of Tank 1 and Tank 3. After five (5) days the grease cap appearance in Tanks 1 and 3 remained unchanged. The grease cap in Tank 2 had broken up and resembled a thawing ice field having patches of grease surrounded by areas of open water.

After one (1) week a second addition of each additive, respectively, was made to Tanks 2 and 3. At the end of the second week, the only noticeable difference was found in Tank 2. Tank 2 was clearer than the other tanks indicating that the solids in Tank 2 were being cleared while the solids in the other tanks were not being cleared. The odor from Tank 2 was again appreciably less that the odor emanating from Tanks 1 and 3. In addition, Tank 2 exhibited a further reduction in the grease cap while Tanks 1 and 3 exhibited no change in their grease cap.

Example 4

At the end of the two (2) weeks, the experiments conducted in Example 3 were expanded. In particular, MICROBEST® brand microbial grease digester, which is reported to contain microbial enzymes that break down proteins and fats and is available from Biocleansing Systems, Fort Lauderdale, Fla. 33316,was added to the control, Tank 1. The entire contents of one packet, 10 mls, was added to Tank 1 as described above. Three (3) mls of the biocatalyst prepared in Example 1 was added to Tank 2. Three (3) mls of PX700 was added to Tank 3, which contained the BIOSOLVE® brand product. Again the tanks were observed for two (2) weeks.

Tank 1 showed no discernable activity. In order to rule out the possibility that the MICROBEST® brand sample was defective or had been stored longer than recommended, a second fresh sample was obtained and added to Tank 1 as described above. After an additional period of two weeks no change was observed in Tank 1.

Tank 3 showed the thawing ice field, as described above. However, the changes in Tank 3 were not as dramatic as the changed seen in Tank 2 utilizing the biocatalyst of the present invention.

Tank 2 again exhibited a further reduction in the size of the grease cap. In addition, noticeable odor differences existed between the three tanks. Tank 1 exhibited the most objectionable odor, followed by Tank 3. Surprisingly, the odor in Tank 2 was the least objectionable.

As is seen from the above results the biocatalyst of the present invention is an effective agent for use in the bioremediation of grease, oils and solids and is effective at controlling odor in grease traps and septic tanks. As can be appreciated by those skilled in the art adjustments to the volume of biocatalyst added to full scale grease traps and septic tanks will be necessary. In addition, it is within the skilled artisan's expertise to make any necessary adjustments in frequency of treatment for full scale grease traps and septic tanks.

Example 5

The biocatalyst of Example 1 was tested in the grease traps of restaurants of a popular chain in Fort Lauderdale, Fla. At the start of treatment 100 mls of the biocatalyst prepared in Example 1 was added to the grease traps daily for three (3) consecutive days. After the initial treatment the grease traps were treated weekly with 100 mls of the biocatalyst prepared in Example 1 for a period of eight (8) months. Prior to use of the biocatalyst of the present invention the restaurant manager reported that is was typically necessary to pump out the grease traps one (1) to two (2) times per month. During the treatment period using the present invention the restaurant manager reported that it was necessary to pump out the grease traps every four (4) to six (6) months. The restaurant manager also reported that the odor emanating from the grease traps has substantially decreased due to use of the biocatalyst of the present invention. These results clearly indicate that the present invention is effective in the bioremediation of grease, oils and solids and is effective at controlling odor in grease traps and septic tanks.

Example 6

Growth studies and resistance to stress were performed on tomato plants. Specifically, potted tomato plants were selected that were similar in size, approximately 1 foot in height, randomized and labeled. Each group consisted of two (2) plants. Group 1 was treated with the biocatalyst prepared in Example 1. Group 2 was treated with a biocatalyst prepared in accordance with Example 1 except that methanol containing 0.2% methylparaben was used to extract the kelp. Group 3 was treated with PX700. Group 4 was the Control Group and was treated with water. The potted tomato plants were transplanted to fertile soil and treated as indicated above. The tomato plants were observed for a total of eight (8) weeks after transplant. Visual observations including wilting, loss of leaves, time and duration of blooming were also recorded. In addition, at the end of the eight (8) week study the roots of each plant were examined. Plant height in inches was measured at the times indicated in Table 1.

As shown in Table 1, Group 4 tomato plants exhibited the most dramatic transplant shock and remained substantially smaller than any of the other groups. Group 4 plants were the first to die during the experiment.

Group 1 tomato plants exhibited very little transplant shock and were substantially taller than the plants in any other group. Group 1 tomato plants bloomed earlier than any of the other groups and were substantially more resistant to dehydration and drought. In addition, these plants were still viable at the end of the eight week study period.

Group 2 tomato plants exhibited some transplant shock and remained smaller than the Group 1 tomato plants. In addition, Group 2 plants were not viable at the end of the eight week study.

Group 3 tomato plants also exhibited some transplant shock and also remained smaller that the Group 1 tomato plants. The Group 3 plants also died during the study. In addition, the Group 3 plants developed mites. It is possible that a contaminant of the PX700 caused the Group 3 plants to be more susceptible to mites.

At the end of the eight (8) week study the roots of each plant were examined. In particular, the plants were pulled and the soil was gently shaken from the root system of each plant. Upon visual inspection the root mass of Group 1 tomato plants was substantially greater than that of the other groups. Specifically, the roots of the Group 1 tomato plants were longer and exhibited more branching than the roots of the tomato plants of Groups 2, 3, and 4.

These results verify that the biocatalyst of the present invention enhances plant growth, including root growth, drought resistance and shortens plant maturity times so plants bloom earlier.

TABLE 1

| Duration | Group 1 (inches) | Group 2 (inches) | Group 3 (inches) | Group 4 (inches) |
|---|---|---|---|---|
| Start | 10.0 | 10.0 | 10.0 | 10.0 |
|  | 10.0 | 9.5 | 10.0 | 9.5 |
| 2 weeks | 14.5 | 13.5 | 12.5 | 12.0 |
|  | 14.0 | 13.0 | 12.5 | 12.5 |
| 4 weeks | 18.5 | 14.5 | 13.5 | 14.0 |
|  | 18.5 | 15.0 | 14.0 | 14.5 |
| 6 weeks | 22.0 | 18.0 | 16.5 | 15.5 |
|  | 22.0 | 18.5 | 17.5 | 16.0 |
| 8 weeks | 24.0 | 19.0 | 20.5 | 18.0 |
|  | 26.0 | 19.5 | 20.0 | 18.5 |

While there have been described what are presently believed to be the preferred embodiments of the present invention, those skilled in the art will realize that changes and modifications may be made thereto without departing from the scope of the invention as particularly pointed out and distinctly claimed in the claims appended and all legal equivalents, and it is intended to claim all such changes and modifications as fall with the scope of the invention.

What is claimed is:

1. A method for preparing a biocatalyst comprising:
   providing a source of kelp;
   adding a five percent ethyl alcohol aqueous solution to the source of kelp, the five percent ethyl alcohol aqueous solution containing an effective amount of a preservative, to provide a kelp/five percent ethyl alcohol aqueous solution containing the effective amount of the preservative;
   reacting the kelp/five percent ethyl alcohol aqueous solution containing the effective amount of the preservative under conditions and for an amount of time sufficient to extract the kelp/five percent ethyl alcohol aqueous solution containing the effective amount of the preservative; and
   filtering the kelp/five percent ethyl alcohol aqueous solution containing the effective amount of the preservative to provide a kelp extract/five percent ethyl alcohol biocatalyst solution containing the effective amount of the preservative.

2. The method according to claim 1 wherein the source of kelp is a kelp selected from the group consisting of *Laminaria digitata, Laminaria saccharina, Laminaria cloustoni* Edmondst, *Fucus versiculosus, Ecklonia maxima, Durvillea antarctica, Pachymenia himantophora, Macrocystis integrifolia, Hypnea chordacea f. simpliciuscula, Hypnea charoides, Hypnea japonica, Hypnea cervicornia, Hypnea musciformis, Hypnea bryoids, Hypnea pannosa, Hypnea erecta, Hypnea specifera, Hypnea saidana*, and *Ascophyllum nodosum*.

3. The method according to claim 1 wherein the source of kelp is present in an amount from 5 grams to 50 grams per liter of the five percent ethyl alcohol aqueous solution containing the effective amount of the preservative.

4. The method according to claim 3 wherein the source of kelp is present in an amount from 10 grams to 30 grams per liter of the five percent ethyl alcohol aqueous solution containing the effective amount of the preservative.

5. The method according to claim 4 wherein the source of kelp is present in an amount of 20 grams per liter of the five percent ethyl alcohol aqueous solution containing the effective amount of the preservative.

6. The method according to claim 1 wherein the ethyl alcohol is a non-denatured ethyl alcohol selected from the group consisting of food grade ethyl alcohol, anhydrous ethyl alcohol, reagent grade ethyl alcohol and high performance liquid chromatography grade ethyl alcohol.

7. The method according to claim 6 wherein the non-denatured ethyl alcohol is food grade ethyl alcohol.

8. The method according to claim 1 wherein the preservative is present in an amount of from 0.1 percent to 2.0 percent of the five percent ethyl alcohol aqueous solution.

9. The method according to claim 8 wherein the preservative is present in an amount of from 0.1 percent to 0.5 percent of the five percent ethyl alcohol aqueous solution.

10. The method according to claim 9 wherein the preservative is present in an amount of from 0.3 percent to 0.4 percent of the five percent ethyl alcohol aqueous solution.

11. The method according to claim 1 wherein the preservative is selected from the group consisting of methylparaben, propylparaben, ethylparaben, butylparaben, benzylparaben and heptylparaben.

12. The method according to claim 11 wherein the preservative is methylparaben.

13. The method according to claim 12 wherein the preservative is present in an amount of 0.2 percent of the five percent ethyl alcohol aqueous solution.

14. The method according to claim 1 further comprising:

adding an effective amount of seawater to the kelp extract/five percent ethyl alcohol biocatalyst solution containing the effective amount of the preservative.

15. A biocatalyst comprising:

a kelp extract/five percent ethyl alcohol biocatalyst solution and an effective amount of a preservative wherein the preservative being diluted to an ineffective amount during use of the biocatalyst, the biocatalyst further comprising,: an effective amount of seawater.

16. The biocatalyst according to claim 15 wherein the kelp extract/five percent ethyl alcohol biocatalyst solution is prepared using from a kelp selected from the group consisting of *Laminaria digitata, Laminaria saccharina, Laminaria cloustoni* Edmondst, *Fucus versiculosus, Ecklonia maxima, Durvillea antarctica, Pachymenia himantophora, Macrocystis integrifolia, Hypnea chordacea f. simpliciuscula, Hypnea charoides, Hypnea japonica, Hypnea cervicornia, Hypnea musciformis, Hypnea bryoids, Hypnea pannosa, Hypnea erecta, Hypnea specifera, Hypnea saidana*, and *Ascophyllum nodosum.*

17. The biocatalyst according to claim 15 wherein the kelp extract/five percent ethyl alcohol biocatalyst solution is prepared using a non-denatured ethyl alcohol selected from the group consisting of food grade ethyl alcohol, anhydrous ethyl alcohol, reagent grade ethyl alcohol and high performance liquid chromatography grade ethyl alcohol.

18. The biocatalyst according to claim 17 wherein the non-denatured ethyl alcohol is food grade ethyl alcohol.

19. The biocatalyst according to claim 15 wherein the preservative is present in an amount of from 0.1 percent to 2.0 percent of the kelp extract/five percent ethyl alcohol biocatalyst solution.

20. The biocatalyst according to claim 19 wherein the preservative is present in an amount of from 0.1 percent to 0.5 percent of the kelp extract/five percent ethyl alcohol biocatalyst solution.

21. The biocatalyst according to claim 20 wherein the preservative is present in an amount of from 0.3 percent to 0.4 percent of the kelp extract/five percent ethyl alcohol biocatalyst solution.

22. The biocatalyst according to claim 15 wherein the preservative is selected from the group consisting of methylparaben, propylparaben, ethylparaben, butylparaben, benzylparaben and heptylparaben.

23. The biocatalyst according to claim 22 wherein the preservative is methylparaben.

24. The biocatalyst according to claim 23 wherein the preservative is present in an amount of 0.2 percent of the kelp extract/five percent ethyl alcohol biocatalyst solution.

* * * * *